Aug. 3, 1971    R. J. NEVAREZ OCAMPO    3,597,513
METHOD OF CONSTRUCTING A BUILDING
Original Filed Nov. 2, 1967    6 Sheets-Sheet 1

Ricardo J. Nevarez (Ocampo)
INVENTOR.

BY *Clarence A. O'Brien*
*and Harvey B. Jacobson*
Attorneys

Aug. 3, 1971   R. J. NEVAREZ OCAMPO   3,597,513
METHOD OF CONSTRUCTING A BUILDING
Original Filed Nov. 2, 1967   6 Sheets-Sheet 2

Ricardo J. Nevarez (Ocampo)
INVENTOR

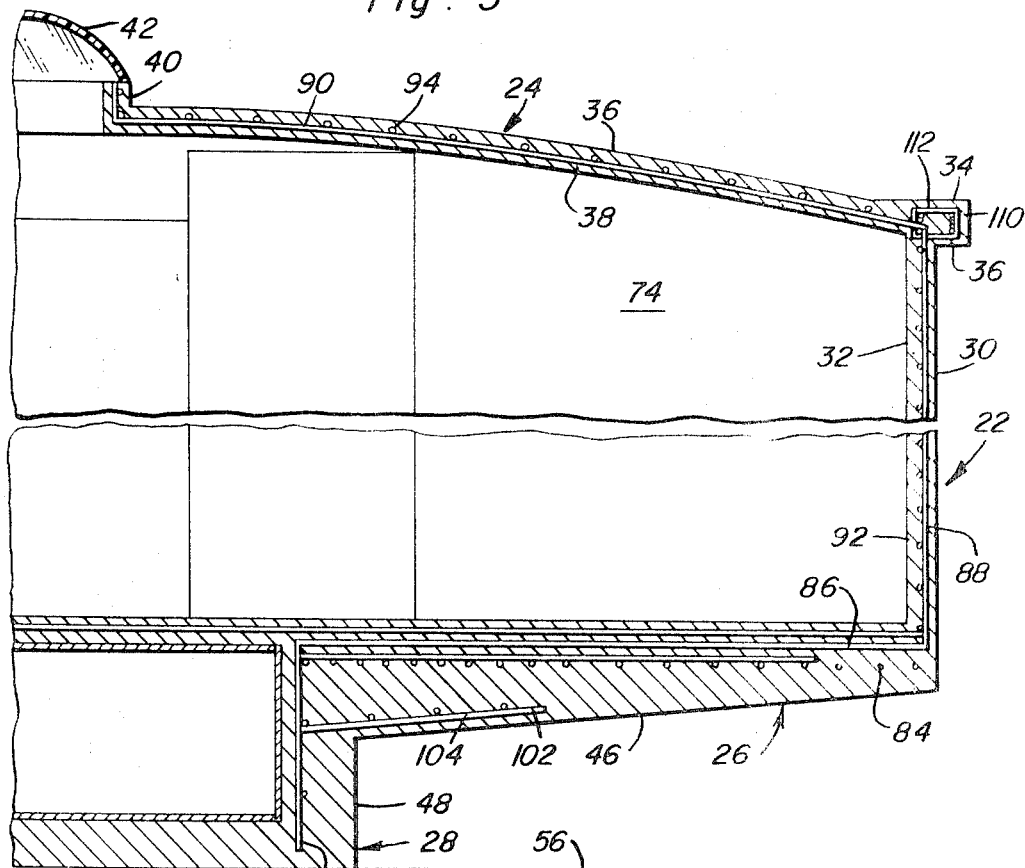
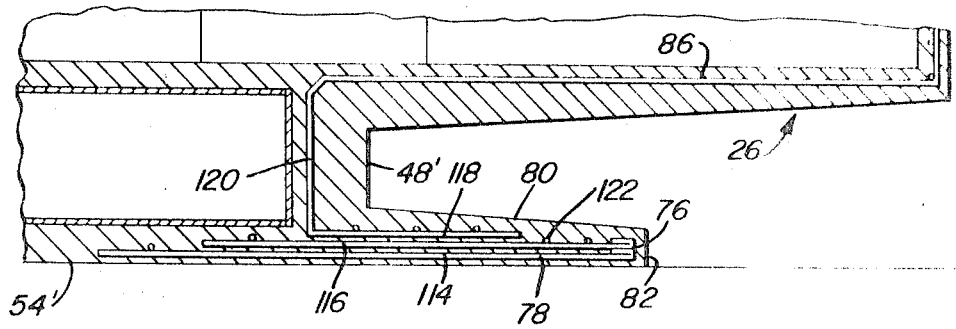

Aug. 3, 1971  R. J. NEVAREZ OCAMPO  3,597,513
METHOD OF CONSTRUCTING A BUILDING
Original Filed Nov. 2, 1967  6 Sheets-Sheet 4
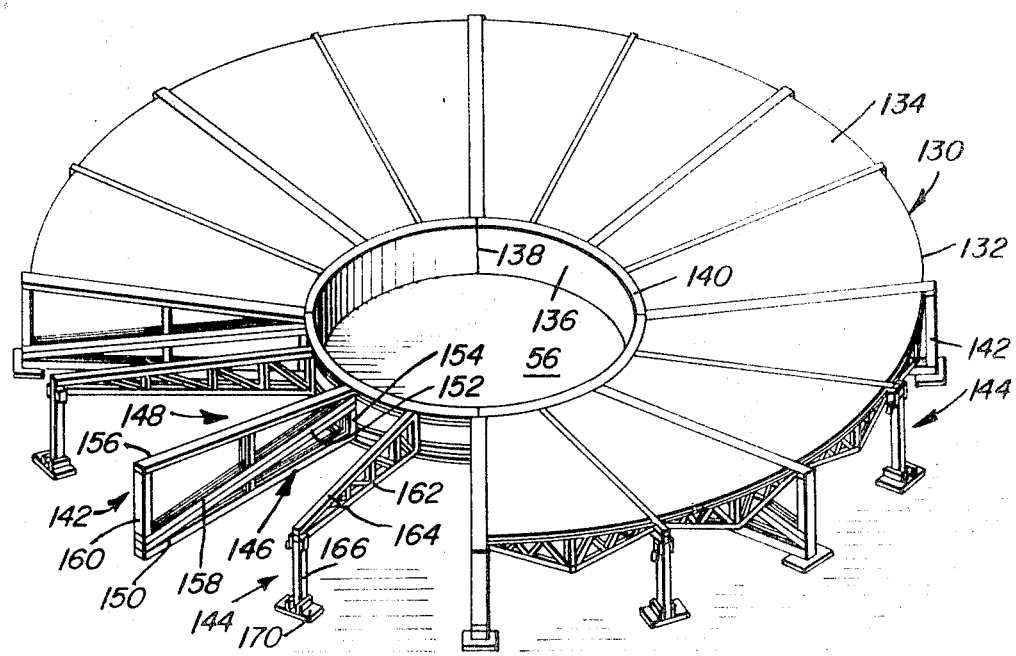
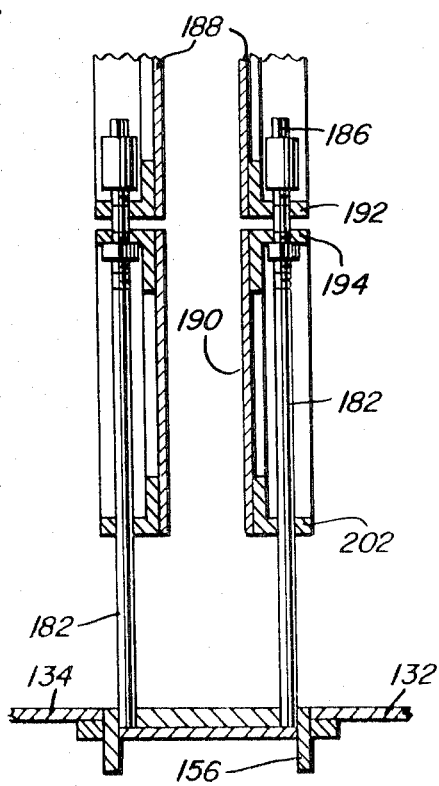
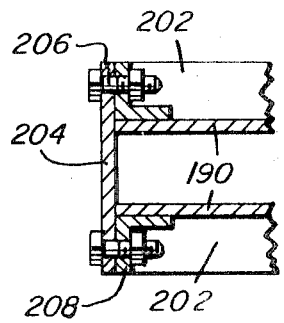
Ricardo J. Nevarez (Ocampo)
INVENTOR
BY Clarence A. O'Brien
and Harvey B. Jacobson
Attorneys Aug. 3, 1971 R. J. NEVAREZ OCAMPO 3,597,513

METHOD OF CONSTRUCTING A BUILDING

Original Filed Nov. 2, 1967 6 Sheets-Sheet 5

Ricardo J. Nevarez (Ocampo)
INVENTOR

United States Patent Office 3,597,513
Patented Aug. 3, 1971

3,597,513
METHOD OF CONSTRUCTING A BUILDING
Ricardo J. Nevarez Ocampo, Mexico City, Mexico, assignor to Joseph Abelow, Miami Beach, Fla.
Original application Nov. 2, 1967, Ser. No. 680,103, now Patent No. 3,436,052, dated Apr. 1, 1969. Divided and this application Mar. 28, 1969, Ser. No. 811,476
Int. Cl. E04b *1/16;* E04g *11/04*
U.S. Cl. 264—32
2 Claims

ABSTRACT OF THE DISCLOSURE

A method of constructing a monolithic building of cementitious material in which a mold is supported from the ground surface with a portion thereof open to the ground surface and pouring a complete building in one pour of fluent cementitious material. The mold is vibrated to reduce void spaces, reinforcing rods are employed and partition walls are formed during the single pour.

---

This application is a division of Ser. No. 680,103, filed Nov. 2, 1967, now Pat. No. 3,436,052, issued Apr. 1, 1969.

The present invention generally relates to a method of constructing a building structure of monolithic construction having a continuous peripheral wall, roof, floor, partition walls and supporting pedestal which forms the sole support for the building and rests directly upon the ground surface which eliminates the necessity of providing foundations, footings or the like thereby materially reducing the cost of the building structure. The building is preferably circular in plan configuration with the pedestal also being circular but of considerably less diameter than the peripheral wall. Reinforcement rods are positioned in a particular manner to effectively reinforce the building with the areas of concentrated stress having a greater reinforcement than other areas of the building. In addition, all of the forces exerted by the building components are transmitted inwardly to the pedestal so that all support for the building originates from confines of the pedestal.

In addition to the foregoing, the present invention also includes a method utilizing a form which shapes and conforms the fluent cementitious material into the desired final configuration so that after the form has been set up, the entire building is formed in a single operation in which the fluent cementitious material is introduced into the form in order to complete the entire building in a single operation after which the cement is permitted to harden in the usual manner. The forms are so constructed that the components thereof forming interior wall surfaces are capable of being released from the concrete forming the building. This function is accomplished by providing spaces between adjacent sections of portions of the forms defining an inner surface of a wall so that the form sections may be removed by radial inward movement in relation to the building.

It is the primary object of the present invention to provide a method of constructing a monolithic building construction primarily intended for use as living quarters with the total cost of materials and labor maintained at a very low cost to enable relatively low cost housing to be provided for housing persons having low incomes.

It is another object of the present invention to provide a method of constructing low cost housing which is extremely simple in construction and capable of being constructed by relatively unskilled labor which is usually available in areas in which low cost housing would be desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a vertical sectional view, on an enlarged scale, taken substantially upon a plane passing along section line 3—3 of FIG. 2 illustrating specific structural details of the building including the construction of the floor, pedestal, peripheral wall, overhang and roof structure;

FIG. 4 is a fragmental sectional view illustrating a modified type of pedestal which may be employed;

FIG. 8 is a perspective view of a portion of the mold illustrating the supporting structure and portions of the components forming the floor and pedestal;

FIG. 13 is a detailed sectional view illustrating the structure of the leveling element for supporting portions of the mold; and FIG. 14 is a detailed sectional view illustrating the manner of interconnecting the inner ends of partition wall forming members.

Figure 1:
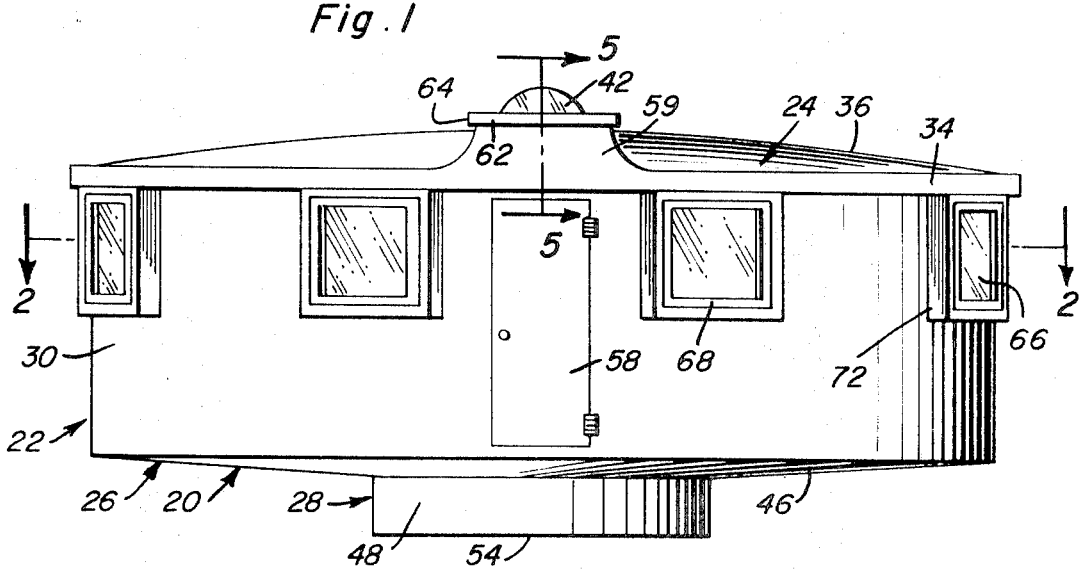
FIG. 1 is a side elevational view of a monolithic building in the form of a house constructed in accordance with the present invention.

Referring now specifically to the drawings, the building structure of the present invention is specifically illustrated in FIGS. 1–7 and is designated generally by reference numeral 20 and includes a peripheral wall 22, a shallow dome-shaped roof 24, a floor 26 and a central pedestal 28 forming the sole support for the building structure. The entire construction of the wall 22, roof 24, floor 26 and pedestal support 28 is monolithic or one-piece unitary structure of reinforced concrete in which all of the components are formed simultaneously by a single pouring of concrete. As illustrated, the building structure 20 is of cylindrical configuration and is illustrated as a single unit. However, other curved configurations such as ellipitical may be employed and fall within the purview of this invention. Also, multiple units may be formed and interconnected by any suitable connecting passageways as deemed appropriate for the particular requirements and individual installation. While dimensions may vary, it has been found that the wall 22 may conveniently have the diameter of approximately 24 feet while the pedestal 28 may be approximately 9 feet with the height being adequate to provide headroom for occupants of the building. The building structure is especially useful as dwelling houses and may be constructed at a very low cost and very little maintenance and upkeep is required thereby facilitating the use of the building structure as low cost housing in areas having relatively low income per capita.

The wall 22 is provided with a relatively smooth and continuous outer surface 30 and a similar inner surface 32 concentric therewith. At the upper end of the wall 22, there is provided a peripheral outwardly extending ledge 34 which forms an overhang or eave around the periphery of the building. The undersurface of the overhang 34 is provided with a notch 36 or the like to provide a drip lip to preclude water from running back along the lower surface of the overhang 34 and thus down the outer surface of the wall 22. The roof 24 is shallow dome-shaped in configuration with the outer surface 36 being contiguous with the upper surface of the overhang 34 and the inner surface 38 being concave and joined with the inner surface 32 of the wall 22. At the center of the roof 24, there is provided an upwardly extending cylindrical projection 40 on which is mounted a dome-shaped skylight 42 preferably of transparent or translucent material to enable outside light to enter the central portion of the building. The dome-shaped skylight 42 may be constructed of glass, plastic or the like and provided with any suitable degree of transparency, coloring or the like. In addition, if desired, an openable ventilator structure may be provided in the skylight to provide for natural convection ventilation, or, if desired, a forced type of ventilator may be provided such as a fan or the like to remove air from the apex of the roof 24. The skylight 42 may be secured to the roof 24 in any suitable manner and may be removable to enable easy access to the roof structure. Any suitable waterproofing may be provided for the upper surface of the roof 36 such as conventional roofing materials such as tiles, shingles, or a covering of bituminous material or the like.

The floor 26 has a substantially flat and continuous upper surface 44 while the lower surface 46 thereof is inclined downwardly and inwardly so that the thickness of the floor increases from the outer periphery thereof toward the center with the thickest portion of the floor 26 being at the inner periphery thereof where the pedestal support 28 is formed. The pedestal support 28 is also cylindrical and provided with a continuous cylindrical outer surface 48 and a hollow interior 50 which is left hollow to reduce the quantity of material employed or to provide a storage space which requires that an access opening be provided in the floor together with a suitable closure to enable the closure to be removed and access being to the interior 50 of the pedestal support 28. This enables storage of various items such as those used infrequently and may also be used to store items of considerable value. A hollow liner 52 is provided for the hollow interior 50 to enable formation of the pedestal support which may be a relatively inexpensive item inasmuch as it would not be recoverable unless the floor surface 44 is provided with an opening enclosure therefor in which event the liner 52 will be recoverable. The bottom surface 54 of the pedestal support 28 is relatively flat and is supported directly on the ground surface 56 thereby eliminating the necessity of providing underground foundations, footings and the like. This also enables a minimum of site preparation inasmuch as it is only necessary to level a portion of the ground surface 56 sufficient to receive the bottom surface 54 of the pedestal support 28. Even if the ground surface 56 is not exactly level, when the building section 20 is formed, all components thereof will be levelled and the pedestal support 28 forms the sole contact and engagement with the ground surface unless it is desired to build-up a walkway to the floor level to enable access to a door 58 provided in the wall 22 which may be of conventional construction. A single door 58 may be provided or, if desired, diametrically opposed doors or a multiplicity of doors may be provided depending upon the requirement of each individual installation. In the event, a multiple of building structures are to be disposed in communicating relation, then a second door would be normally provided so that the two building structures could be interconnected by a walkway, passageway or the like.

Formed integrally and unitarily with the roof 24 above the door 58 is a water storage tank defined by an upwardly extending wall 59 which defines the periphery of the hollow interior 60 of the tank. A closure cap 62 having depending flanges 64 is telescoped over the upper end of the hollow tank defined by the peripheral wall 59. This tank is provided for water storage so that during periods of low pressure in the normal water supply system, water will be available from the storage tank 60. In some areas, the water storage tank will not be necessary and represents an optional construction. As illustrated in FIG. 1, the tank is disposed above the door 58 inasmuch as it interrupts the roof line and actually enhances the appearance characteristics of the building. While the wall 59 of the water storage tank is not necessarily reinforced especially if the building is to be used in areas having relatively high average temperatures in which event the water would not be subject to freezing. If the building is constructed in areas having freezing temperatures, the wall 59 should be reinforced or, in some instances, it may be necessary to form the tank on the interior of the roof, rather than the exterior thereof. The interior surface of the tank is also waterproofed by any suitable means to enable proper storage of water.

Figure 2:
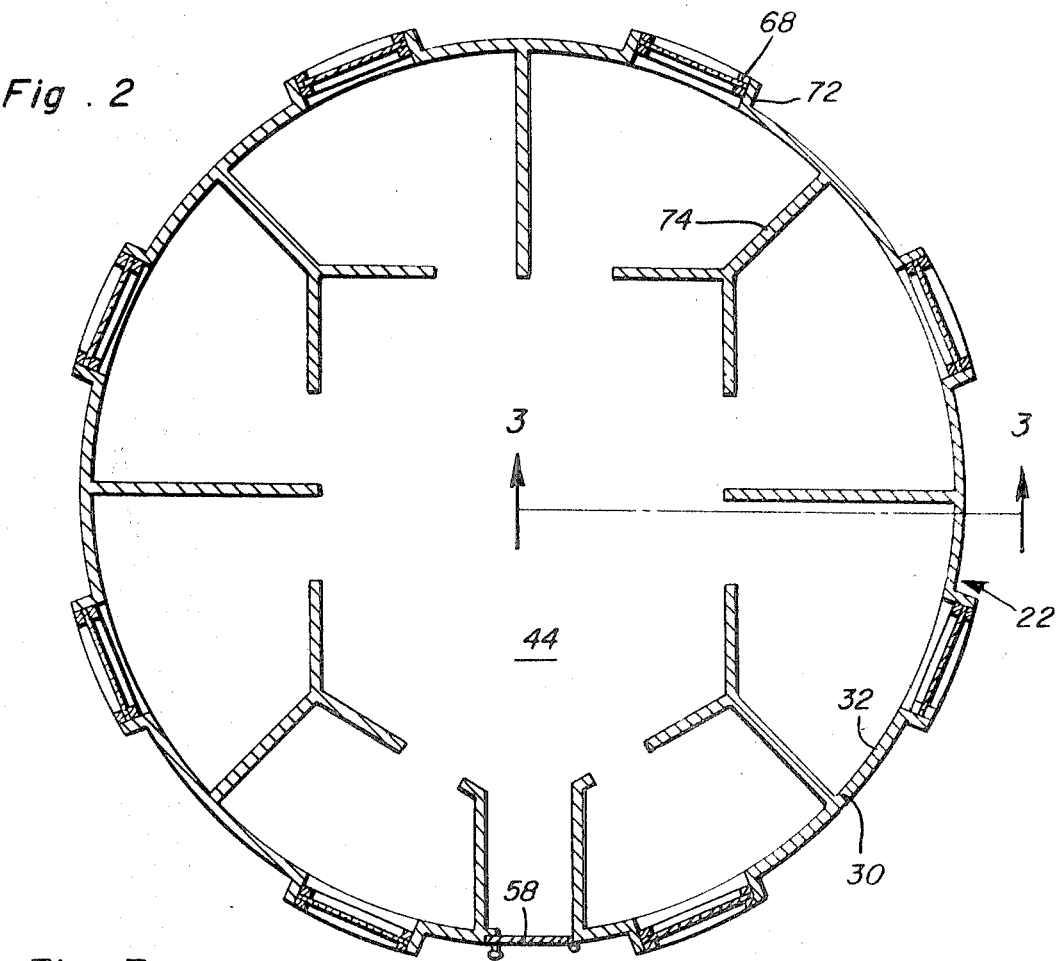
FIG. 2 is a plan sectional view taken substantially upon a plane passing along section line 2—2 of FIG. 1 illustrating one floor plan employing the essential features of the present invention therein.
Figure 7:
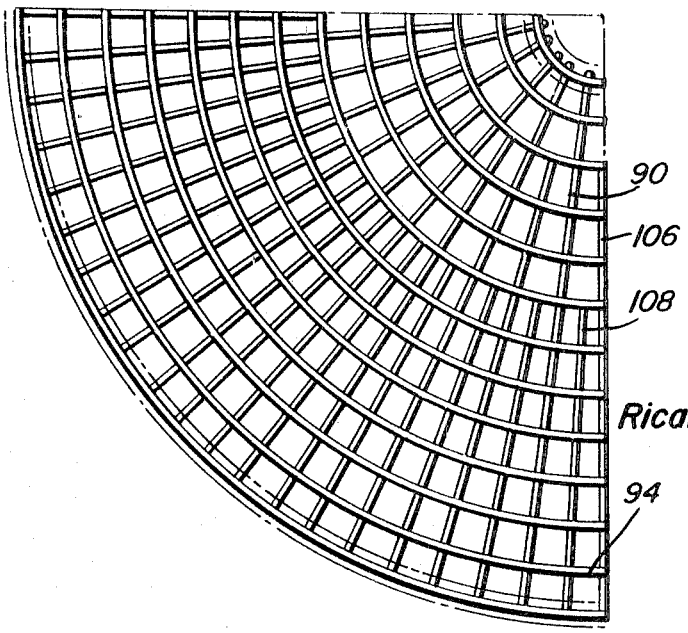
FIG. 7 is a fragmental plan view illustrating a portion of the reinforcement employed in the roof.

A plurality of window units 66 are provided in which the frames 68 are received in outwardly projecting flange members 72 which are integral with the wall 22. The flange or ledge 72 is disposed peripherally of the sash or frame 68 with the window units being of any suitable construction and which the frames are preferably constructed of metal, such as aluminum or the like with the windows having movable panels, pivotal panels or the like together with adequate screening to enable air circulation through the building in a conventional manner. Also, interior partition walls 74 are formed unitarily with the floor 26, peripheral wall 22 and roof 24 and such partition walls may be arranged in various manners to provide room areas of different size and location as desired. As illustrated in FIG. 2, all of the partition walls extend inwardly with certain of the walls 74 terminating in diverging portions to form peripherally located rooms having entrance-ways which may be provided with doors as desired. Termination of the partition walls provides an open central space which may be employed as a living area, combined living area and dining area or the like. As illustrated in FIG. 2, the partition walls define eight enclosed areas. However, by omitting certain of the partition walls, the size of the enclosures may be increased and, of course, the number of enclosed areas will be decreased. The enclosed areas will normally include a bathroom, a kitchen, bedrooms, and if desired, closet space or storage areas. The partition walls are also preferably reinforced and are not load bearing walls with the surfaces thereof being painted or otherwise decorated in accordance with the desires of the person or persons occupying the building structure.

FIG. 4 illustrates a modified form of the pedestal support designated generally by reference numeral 28' in which the lower end of the pedestal support is provided with an outwardly extending peripheral base 76 which has a substantially flat lower surface 78 contiguous with the flat bottom surface 54' of the pedestal support 28'. The upper surface of the base 76 is inclined downwardly and outwardly at 80 so that the thickest portion of the base is adjacent the peripheral wall 48' of the pedestal support 28'. The base 76 is provided with a peripheral wall 82 concentric with respect to the peripheral wall 48' but inwardly of the peripheral wall 22 of the building structure and the base 76 is also reinforced with the greatest area of reinforcement being at the inner end of the base 76 where it is continuous with the pedestal support 28'.

Figure 6:
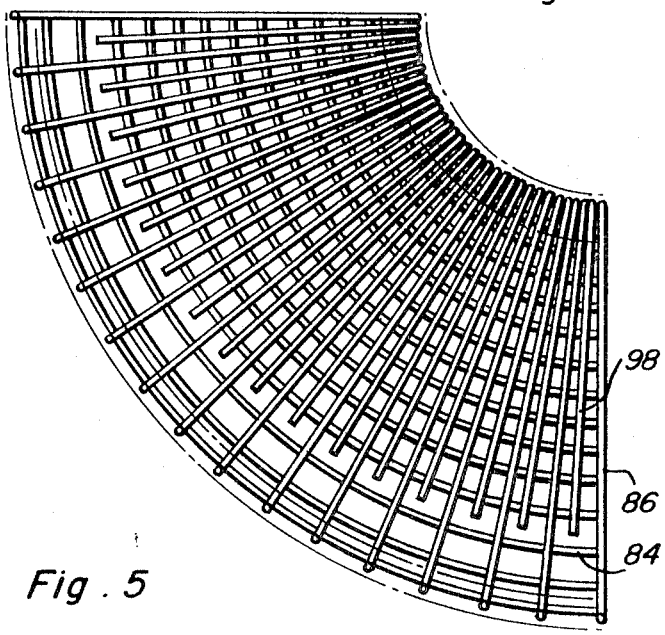
FIG. 6 is a plan view of a segment of the reinforcement employed in the floor.
Figure 5:
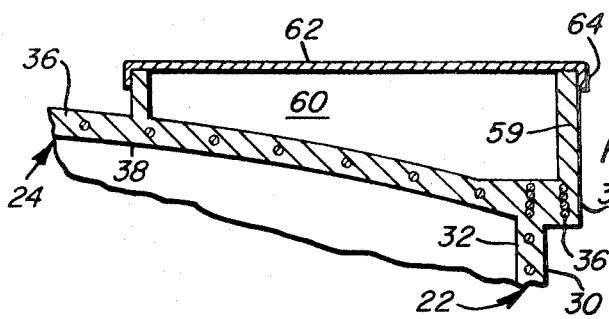
FIG. 5 is a detail sectional view taken substantially upon a plane passing along section line 5—5 of FIG. 1 illustrating a water storage tank incorporated into the building structure.

FIG. 6 is a plan schematic view illustrating the reinforcement layer in the floor which includes a plurality of concentric, radially spaced reinforcing rods 84 which progressively increase in radial spacing from the interior portion of the floor to the exterior thereof. Disposed above the peripheral or circumferential reinforcing rods 84 is a plurality of radial reinforcing rods 86 which are continuous radially of the floor 26, upwardly through the wall 22 and then inwardly of the roof 24. The rods 86 are designated as 88 in the wall 22 and 90 in the roof 24. The peripheral or circumferential reinforcing rods also continue up the wall 82 as designated by numeral 92 and in the roof 24 as designated by the numeral 94. As illustrated in FIG. 3, the floor 26 is provided with additional reinforcing rods 96 extending completely across the floor including the area over the hollow interior 50 unless there is provided an access opening enclosure therefor in which event the reinforcing rods 96, of course, would not be continuous. In addition to the continuous reinforcing rods 86 which extend radially, there is provided a plurality of radial rods 98 which terminate inwardly of the outer periphery of the floor 26 and are secured to the rods 84 as illustrated in FIG. 6. The inner end of the rods 86 and 98 are connected with depending circumferentially spaced reinforcing rods 100 in the pedestal support 48. Additional partial radial reinforcing rods 102 extend from the rods 100 along the lower surfaces 46 of the floor 26 or a portion of the radial dimension thereof. In addition, peripheral reinforcing rods 102 are provided in this area of the floor and are connected with the radially reinforcing rods 102.

In the roof, in addition to the radial rods 90 there are provided additional partial radial reinforcing rods 106 and 108 which extend inwardly from the periphery of the wall partially inwardly toward the flange 40 with the rods 106 being longer than the rods 108. The overhang or lip 34 is provided with a plurality of peripheral reinforcing rods 110 combined with encircling reinforcing rods 112 around the peripheral rods 110 as illustrated in FIG. 3 to effectively reinforce this area of the building structure.

In FIG. 4, the base 76 is provided with radial reinforcing rods 114 which extend from a point adjacent the periphery thereof inwardly into the bottom portion 54' of the pedestal support 28'. Additional radial reinforcing rods 116 of a shorter length are disposed above the reinforcing rods 114 and additional reinforcing rods 118 are provided above the rods 116 and the rods 118 are continuous as at 120 up through the pedestal support 28' and thence outwardly of the floor 26 as the reinforcing rods 86. Peripheral reinforcing rods 122 are connected to the rods 116 and rods 118 and also peripheral reinforcing rods may be provided in engagement with the rods 114.

The distribution of the reinforcing rods has been calculated in accordance with known techniques to provide adequate reinforcement and strength for the concrete. Any adequate type of reinforcing rods may be employed and they may be interconnected in any suitable manner. Where appropriate, reinforcing rod mats may be employed and supported in proper orientation by any conventional supporting saddle structures or other supports provided as required to orient the reinforcing rods in proper relation when the concrete is being poured into the form employed in constructing the building structure. The concrete may include any suitable mix of cement and aggregate having a suitable insulation factor and strength characteristics so that after the building structure has been formed, it is a single monolithic unit. The surfaces of the building structure may be painted, waterproofed or decorated in any suitable manner and various additions may be provided for the building structure such as awnings, porches, walkways and the like all of which enhance the appearance characteristics thereof. In addition, all utilities such as any electric conductors, outlets, water pipes, gas lines and the like are incorporated into the monolithic structure inasmuch as such utilities are placed in the form when the concrete is being poured whereby they will be embedded in the concrete so that when the form is removed, the building is complete and substantially ready for occupancy except for interior decorating and furnishing and attachment of electrical fixtures, applicances and the like and installation of plumbing fixtures and kitchen fixtures. In the monolithic construction and the pedestal support provide a structure in which the floor is elevated above ground which provides a storage area for various items used outside of the house such as toys, lawnmowers and the like. The concrete is poured in a single pour and may be a manual operation or adequate cement pumps may be employed. Conventional vibration equipment is provided for assuring that the concrete material will not have any large void areas therein. The cylindrical construction or possibly elliptical construction reduces the cost by eliminating corners and also reduces stress concentration points by eliminating sharp corners. The center of gravity of the building structure is substantially coincident with the geometrical center thereof and the pedestal support 28 has both the center of gravity and geometrical center oriented therein with the center of gravity always being oriented within the confines of the pedestal support even though one area of the house made of a larger load, such as furniture or the like, supported therein then another area.

Figure 9:
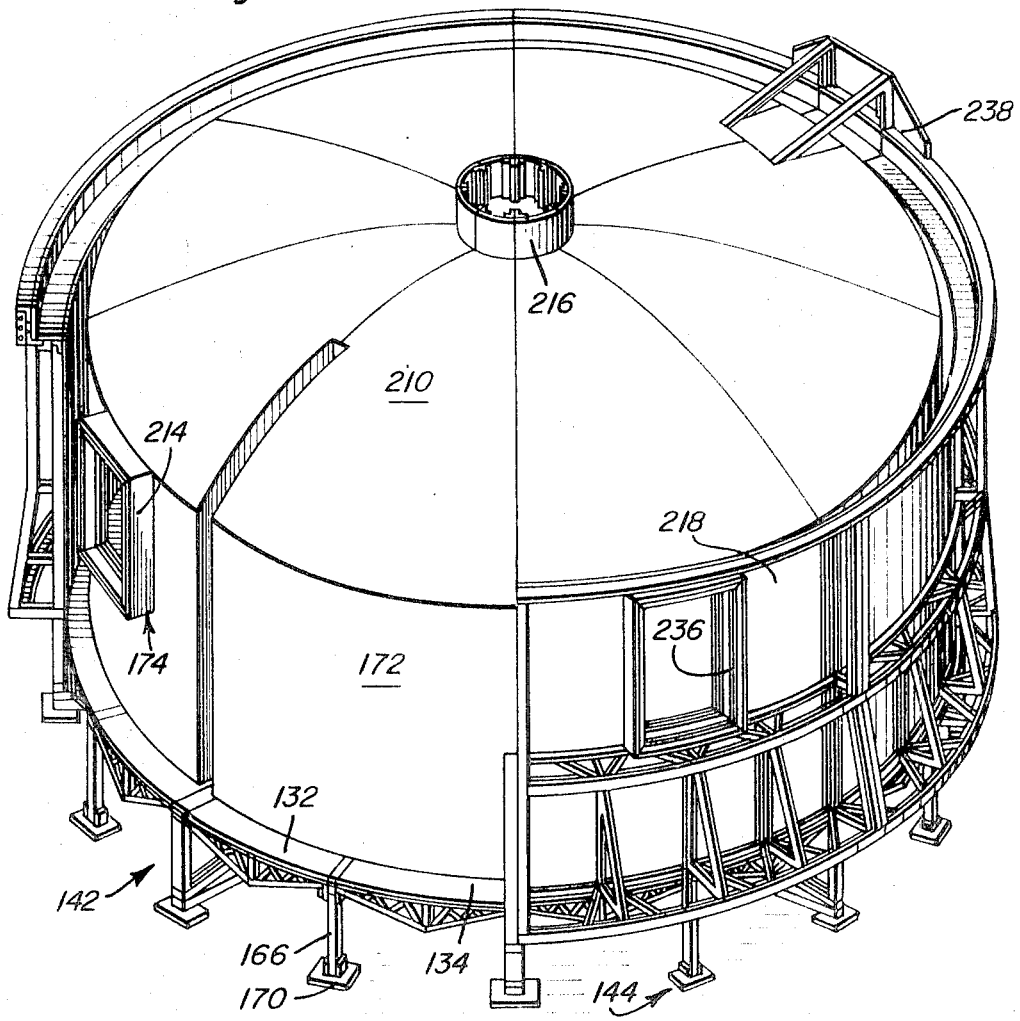
FIG. 9 is a perspective view of the substantially complete mold with a portion of the outer wall thereof omitted.

FIGS. 8–14 illustrate the structural details of the mold employed in forming the building structure 20 illustrated in FIGS. 1–7. FIG. 9 illustrates a substantially complete mold with a portion of the outer wall removed to illustrate the structure thereof.

The floor 26 of the building structure is defined by a plurality of radially extending sections 130 which defines one-eight of the circumference of the floor and includes two separate radial pieces 132 and 134 which are inclined upwardly and outwardly and which have the side edges thereof diverging outwardly as illustrated in FIG. 8. The sections 130 define a complete frusto-conical surface which forms the outer surface 46 of the floor 26. The inner edge of each piece 132 and 134 of the sections 130 are engaged with cylindrical form members 136 which defines the outer surface 48 of the pedestal support 28 and which rests upon the ground surface 56 so that the bottom surface 54 of the pedestal support 28 is actually formed directly on the ground surface 56. The cylindrical wall section 136 is divided into a plurality of separate segments joined together along juncture lines 138 and provided with reinforcing flanges 140 at the bottom and top thereof.

Supporting the edges of the sections 130 are support assemblies 142 and supporting the adjacent edges of the pieces 132 and 134 or support assemblies 144 which serves to support the sections 132 with the outer peripheral edge thereof completely level and the inner peripheral edge thereof completely level and aligned with the top flange of a reinforcement flange 140 on the cylindrical wall form 136.

The support assemblies 142 and 144 must necessarily be removable to enable collapse of the floor sections 130. The support assemblies 132 each include a lower wedge-shaped member 146 and an upper wedge-shaped member 148. The lower wedge-shaped member 146 includes a lower radially extending member 150 engaging the ground surface and an inclined upper member 152 connected with the member 150 by vertical spaces 154 which increase in length inwardly of the member 150 in that the outer end of the member 152 is connected with the outer end of the member 150 and the inner end of member 152 is spaced from the member 150 by a vertical member 154 thus defining an outwardly and downwardly inclined lower wedge support 146.

The upper wedge-shaped member 148 includes an upper member 156 and an inclined lower member 158 interconnected by vertical spaces 160. The inner end of the member 156 is joined with the inner end of the member 158 and the center and outer ends of the members are spaced apart by spacers 160 of increasing length. Thus, the upper wedge 148 includes an inclined member 158 engaged with the inclined member 162 with the upper surface of the wedge member 148 conforming with the inclination of the panels or pieces 132 and 134 which form each of the sections 130. Any suitable connection may be provided between the supports 142 and the sections 130 to enable assembly thereof and also to enable disassembly of the supports 142 by merely striking the upper wedge member 148 such as by striking the inner surface of the spacer 160 with a suitable large hammer to drive the upper wedge member 148 outwardly thus enabling disassembly of the floor support.

Figure 10:
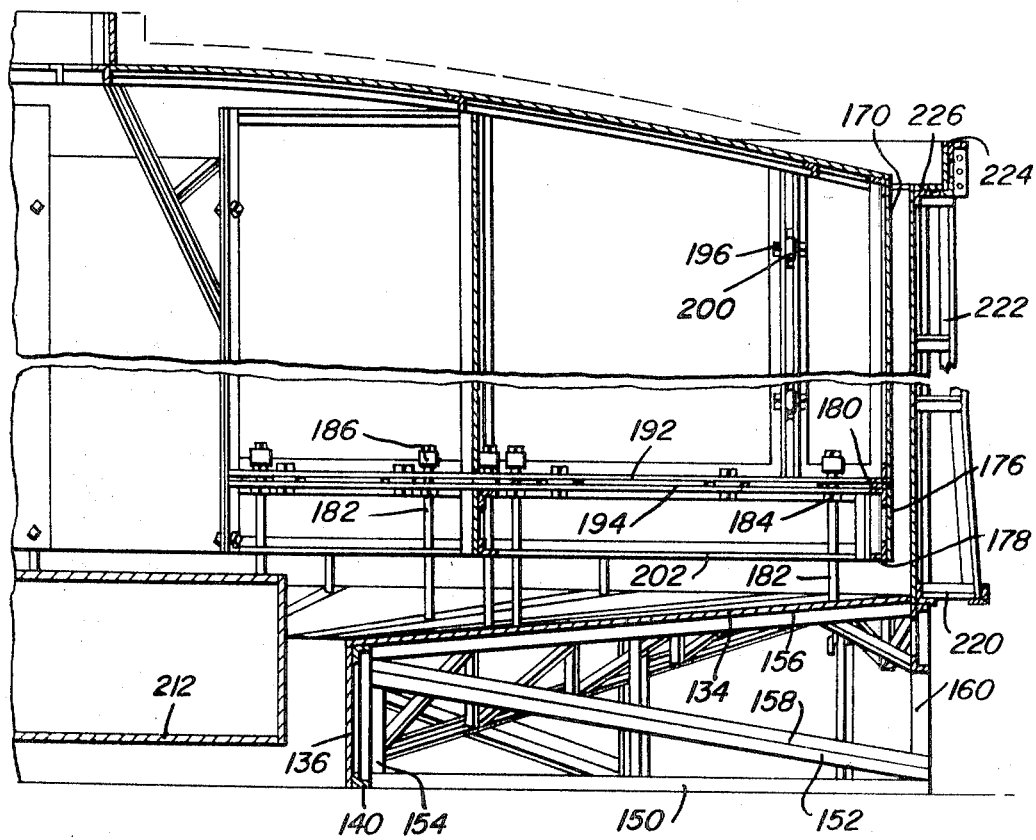
FIG. 10 is a detail sectional view illustrating a portion of the completed mold.

The intermediate supports 144 which support the juncture line between the sheet panels 132 and 134 forming the sections 130 include a truss-like frame 162 having an upper member 164 substantially flush with the upper surface of the panels 132 and 134 with the panels being secured thereto in any suitable manner. Depending from the truss or frame 162 is a supporting leg 166 hingedly attached to the frame 162 by a hinge structure 168. A pivotal foot 170 is provided on the lower end of the supporting leg 166 so that the supporting leg 156 may be pivoted, preferably inwardly about the hinge point 168, by striking the outer surface of the leg 156 with an impact tool such as a large hammer or the like thus enabling the intermediate supports 144 to also be removed. The inner ends of the supports 142 and 144 are received in the reinforcing flanges 140 on the wall form 136 as illustrated in FIG. 10.

The floor assembly is quite significant in forming the mold in that the inclination thereof must be accurate throughout the periphery thereof inasmuch as the outer periphery of the sections 130 must be level and in alignment with each other and the inner periphery thereof as well as the upper edge of the wall forms 136 must also be level and in alignment with each other to define the bottom surface 46 of the floor 26 and the outer surface 48 of the pedestal support 28. The floor assembly as illustrated in FIG. 8 is installed first when setting up the forms and after it has been completed, the inner wall forming structure is completed after which the outer wall forms are completed.

As illustrated in FIG. 9, the structure which defines the inner surface 32 of the peripheral wall 22 includes a plurality of sections in the form of arcuate panels 172 some of which have window forming projections 174 thereon, some of which have door openings formed therein and partition wall forming structures incorporated therein in a manner described hereinafter. Each peripheral wall section 170 has a lower portion thereof defining a lower periphery separated therefrom and designated by numeral 176. The bottom edge of the section 176 is provided with a peripheral reinforcing flange 178 thereon which is attached to the inner surface of the form and a corresponding reinforcement 180 is provided at the upper edge thereof. As illustrated in FIG. 10, the bottom edge of the lower section 176 and the reinforcing flange 178 thereon is spaced from the top surface of the floor forming sections 130 a distance equal to the thickness of the floor 26 where it joins with the wall 22. Disposed through the flanges 178 and 180 is an adjustable supporting rod 182 which is threaded through a nut 184 on the flange 180 and is provided with a polygonal upper end 186 on the upper end of the rod 182 to enable rotation thereof. The lower ends of the rods 182 are supported on the floor assembly in a manner that adjustment of the rods 82 is accomplished by rotation thereof thereby levelling the flange 178 into a parallel relation to the floor sections and into level conditions so that the periphery of the upper surface of the floor will be level.

Figure 11:
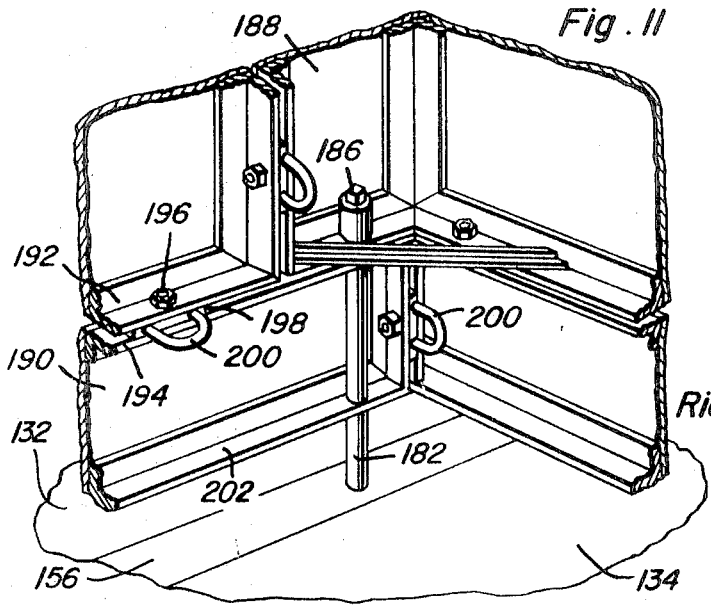
FIG. 11 is a fragmental perspective view illustrating further structural details of portions of the mold forming an interior wall.

Extending from the area between adjacent arcuate sections 172 is a plurality of partitions 188 which are also provided with a lower section 190 and separable sections with the periphery of each of the partitions having a reinforcing flange 192 thereon for matching engagement with the reinforcing flange 194 on the lower section 190. The flanges such as flanges 192 and 194 are secured together by fastener bolts 196 with a spacer 198 being provided between the flanges 192 and 194 so that they will be spaced apart sufficiently to enable removal of the inner wall forming sections of the form after the concrete has hardened. For removing the spacers, the inner edge thereof is provided with a U-shaped handle 200 so that after the bolt 196 has been removed when the concrete has hardened, the spacers may be removed by exerting pressure or force on the handle 200 which then enables the flanges 192 and 194 to move inwardly in a radial manner so that the sections of a form may be removed from the concrete. This spacing, while relatively narrow, provides adequate movement between the sections of the forms to enable removal thereof by collapsing inwardly which would be precluded in the event the flanges 192 and 194 were in abutting engagement with each other. Any small portion of concrete which runs between the flanges 192 and 194 will be easily broken off during normal removal of the form sections. Thus, the sections between the abutting and adjacent flanges of each of the form sections enables the form sections to be removed for collapsible removal of the inner form. As illustrated in FIG. 11, the lower section 190 of the partition walls also have a flange 202 thereon through which the levelling rod 182 extends with the lower flange 200 forming a guide for smoothing the upper surface of the floor 26. The flange 202 will be levelled in a horizontal position as illustrated in FIG. 10 so that the upper surface 44 of the floor 26 will be flat and horizontal by smoothing the concrete to the level of the flange 202 by using a conventional trowel or other suitable means. The upper surface of the floor 44 is completely exposed except for the partition panels 188. The space outwardly of the arcuate sections 172 is continuous with the space between adjacent partition panels 188 so that the partition walls are integral with and monolithic with the outside wall, floor and roof.

The inner edges of the partition defining form sections 188 and the lower portions 190 thereof are closed by a closure plate 204 which extends vertically and is secured in place by fastening bolts 206 which extend through the vertical reinforcing flanges 208 comparable to the flanges 192 and 194. All of the panels defining the form are reinforced by peripheral reinforcement members preferably of angle iron configuration to rigidify the form sections and to provide means for connecting the form sections by the use of bolts on the exterior surface thereof thus leaving the interior surface smooth for defining the surfaces of the walls, partition walls, roof and the like.

The roof is formed by a plurality of I-shaped panels 210 each of which is partially dome-shaped and connected with the upper ends of the panels 170 and partition walls 188 by reinforcing edge members in the form of angle irons and similar connections whereby the roof forming sections 210 will define radial slots defining the upper connection between the partition walls and the roof and will define the inner surface 38 of the roof 24. The outer surface of the roof 36 is defined by a suitable troweling or striking off operation inasmuch as it may be curved slightly as illustrated in FIG. 3 or it may be straight with the undersurface 38 being slightly concave.

When forming the hollow interior for the pedestal, a hollow form 212 is disposed interiorly of the cylindrical sections 136 and supported above the ground surface by any suitable means. If the floor 44 is to be continuous, the hollow form 212 will not be recovered. However, if the enclosure is to have an access opening through the floor, then the form 212 may be sectional and inwardly collapsing in order for removal through the opening which may be defined by an upwardly extending projection on the form having a height extending above the floor surface or, at least flush therewith so that the floor surface may be easily formed by leveling it with the upper edge of the form 212.

As illustrated in FIG. 9, the window forming projections 174 on the inner wall sections may be bolted or otherwise secured thereto and are in the form of flanges 214 which are bevelled or inclined to form an opening in the peripheral wall 22 to receive the window unit. The frame of the window unit may be placed in position prior to pouring of the concrete so that the frame will be held in position by the monolithic concrete. This is also true of the frame for the door or doors depending upon the particular construction involved.

The inner ends of roof sections 210 have upwardly extending arcuate sections 216 mounted thereon which serve to form the inner surface of the upstanding flange 40 on which the skylight 42 is mounted.

Figure 12:
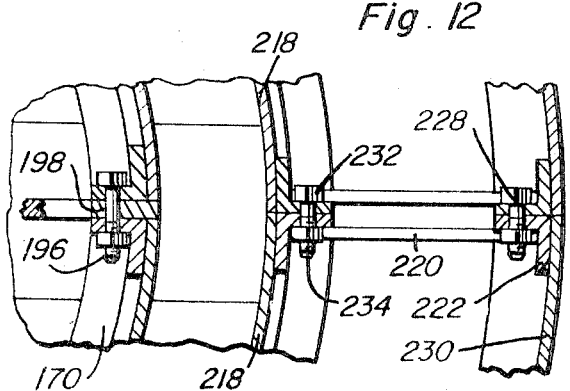
FIG. 12 is a detailed sectional view of a portion of the periphery of the mold.

The external wall of the form which defines the external surface 30 of the peripheral wall 22 is constructed from a plurality of arcuate sections 218 which are engaged with the outer edge portion of the floor sections 130 and secured thereto by the bolting together of flanges. The external panels or sections 218 are provided with reinforcement members 220 which extend radially outwardly with the outer ends thereof being interconnected by vertical reinforcement members 222. The upper end of the sections 218 is provided with an outwardly extending and upwardly extending member 224 defining the undersurface and outer surface of the overhanging lip 34 and including a rib 226 to form the drip lip or groove 36. As illustrated in FIG. 12, the lower brace members 220 are not only connected to vertical brace members 222 by fastener bolts 228 but peripheral brace members 230 are also connected to the lower end of the brace members 222 by welding or the like. Also, the sections 218 of the outer wall have reinforcement members 232 in the form of angle irons secured together by bolts 234.

The outer wall sections 218 are also provided with peripheral flanges throughout the periphery thereof and intermediate reinforcing flanges and gussets where necessary to provide sufficient rigidity to retain the fluent cementitious material while it is hardening. The outer wall sections 218 also have a flange 236 either integral therewith or bolted thereto and bolted to the flange 214 to form the complete periphery for the window flange 72. The window flange may be positioned in a manner between the flange 214 and the flange 236 to enable the window frame to be embedded into the concrete when it is being poured. Also, the frames for the doors may be inserted from the top in a similar manner as the window units before the concrete is poured. Also, form plates 238 are provided for the outer surface of the water tank 58 with suitable spaced form plates extending radially inwardly to define the inner and outer surfaces of the peripheral wall thereof.

The various component parts of the form may be numbered sequentially in such a manner that the components of the form are assembled numerically so that even persons of ordinary skill can properly assemble the form. Also, the components of the form all have been constructed in segments capable of being manually handled without requiring the use of hoists, lifting devices or the like thereby eliminating the necessity of operating complex machinery. All of the surfaces of the form which are engaged by the concrete will be lubricated to prevent adherence between the concrete and the form and to enable release thereof. Another procedure may be employed to simplify the assembly of the form components and that is, the coloring the various abutting surfaces of the components being painted matching colors so that even if the particular segment of the form has been located by number, the coloring on the edges thereof will assure that the segment of the concrete form will be properly oriented when it is assembled with the other segments.

When setting up the mold, in addition to the reinforcement, water lines, electric conductors and the like being properly positioned, radiation type heating assemblies may be placed in the floor, wall or roof to effectively heat the interior space of the building. Also, cylindrical members may be placed on the floor portion of the mold to form cylindrical passages through the floor to enable installation of fans and insect screens therein. This structure enables the cool air underlying the floor of the building to be forced upwardly into the interior thereof for cooling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of constructing a monolithic building from cementitious material consisting of the steps of erecting a sectional external floor forming mold so that the upper surface inclines downwardly and inwardly, erecting an external wall forming mold on the peripheral edge of the floor forming mold, erecting a sectional internal wall forming mold in substantially concentric spaced relation to the exterior wall forming mold, wherein the internal wall forming mold has a bottom flange thereon, supporting the internal wall forming mold vertically from the floor forming mold, positioning spacers at a plurality of points between the sections of the internal wall forming mold to provide unoccupied spaces between the sections to enable inward disassembly of the sections, pouring hardenable fluent cementitious material between the inner and outer molds, allowing the material to flow inwardly under the bottom edge of the internal wall forming mold freely along the upper surface of the floor forming mold, smoothing the cementitious material inwardly of the internal mold at the level of the bottom flange so that the upper surface of the floor will be flat and horizontal, allowing the cementitious material to harden, removing the spacers, readily disassembling the sections of the internal wall defining mold, and removing the external wall and floor defining molds.

2. The method as defined in claim 1 together with the steps of erecting a roof forming mold on the upper peripheral edge of the internal wall forming mold at an elevation below the top edge of the external wall forming mold, erecting partition wall forming molds on the internal wall forming molds in communication with the space between the internal and external wall forming mold, and installing continuous reinforcement wire in the molds from the floor, up through the walls and through the roof, and wherein the step of pouring also covers the roof forming mold with a thickness of cementitious material generally equal to the vertical distance between the top edge of the external wall forming mold and the outer edge of the roof forming mold and fills within the partition wall forming molds and about the reinforcing wire so as to form a unitary structure.

References Cited

UNITED STATES PATENTS

| | | | |
|---|---|---|---|
| 1,332,617 | 3/1920 | Dodge | 249—27 |
| 1,791,645 | 2/1931 | Sprool | 249—27 |
| 2,099,077 | 11/1937 | Pessagno | 249—27 |

DONALD J. ARNOLD, Primary Examiner

J. H. SILBAUGH, Assistant Examiner

U.S. Cl. X.R.

264—71, 334